United States Patent [19]
Agari

[11] Patent Number: 5,553,946
[45] Date of Patent: Sep. 10, 1996

[54] CAGE AND ROLLING GUIDE UNIT ON WHICH IT IS EQUIPPED

[75] Inventor: Norimasa Agari, Gifu-ken, Japan

[73] Assignee: Nippon Thompson Co., Ltd., Tokyo, Japan

[21] Appl. No.: 483,860

[22] Filed: Jun. 7, 1995

Related U.S. Application Data

[63] Continuation of Ser. No. 90,263, Jul. 13, 1993, abandoned.

[30] Foreign Application Priority Data

Jul. 31, 1992 [JP] Japan ................. 4-059164 U

[51] Int. Cl.⁶ ................................................. F16C 29/02
[52] U.S. Cl. ............................................ 384/49; 384/51
[58] Field of Search ................. 384/49, 51, 523, 384/526, 528, 533, 534, 614, 47, 50, 56, 527, 581, 18

[56] References Cited

U.S. PATENT DOCUMENTS

| | | | |
|---|---|---|---|
| 1,982,908 | 12/1934 | Eustis et al. | 384/49 |
| 2,665,958 | 1/1954 | Waldherr, Jr. | 384/527 |
| 3,027,206 | 3/1962 | Potter | 384/534 |
| 3,236,569 | 2/1966 | Moosmann | 384/47 |
| 4,701,059 | 10/1987 | Yokota | 384/51 X |
| 4,741,723 | 5/1988 | Orain | 384/49 X |
| 4,797,011 | 1/1989 | Saeki et al. | 384/47 X |

FOREIGN PATENT DOCUMENTS

| | | | |
|---|---|---|---|
| 3434197 | 3/1986 | Germany | 384/49 |
| 646407 | 2/1989 | Japan . | |
| 5-52217 | 3/1993 | Japan | 384/49 |

*Primary Examiner*—Thomas R. Hannon
*Attorney, Agent, or Firm*—Sughrue, Mion, Zinn, Macpeak & Seas

[57] ABSTRACT

A cage that contributes to smooth operation of a rolling guide unit and said rolling guide unit itself are provided. Projections are formed continuously between each of a plurality of openings, arranged in a row for insertion of rolling elements, that prevent rolling elements from coming out of those openings, thereby increasing the rigidity of the cage to prevent warping. The openings are provided with different sized diameters on opposite sides of the cage. On a given side, larger and smaller diameters alternate.

5 Claims, 9 Drawing Sheets

5,553,946

CAGE AND ROLLING GUIDE UNIT ON WHICH IT IS EQUIPPED

This is a Continuation of application Ser. No. 08/090,263 filed Jul. 13, 1993 now abandoned.

BACKGROUND OF THE INVENTION

1. Field of the Invention

The present invention relates to a cage that holds a rolling element while allowing said rolling element to rotate freely, and a rolling guide unit on which said cage is equipped.

2. Description of the Prior Art

FIGS. 1 and 2 indicate a rolling guide unit for linear motion of the prior art equipped with a cage (to be referred to as a linear motion rolling guide unit). Furthermore, this linear motion rolling guide unit is disclosed in Japanese Examined Utility Model Publication No. 64-6407.

As indicated in FIG. 1, said linear motion rolling guide unit has bed 1 and table 2. The cross-sections of bed 1 and table 2 are each formed into the shape of the letter "U", and track grooves 1a and 2a are formed in the lengthwise direction in the outside and inside of bed 2 and table 2, respectively. Bed 1 is arranged to be on the inside of table 2 so that these track grooves 1a and 2a are opposing each other.

A rectangular plate-shaped cage 3, made of a material such as synthetic resin or the like, is juxtaposed between said track grooves 1a and 2a. As is also indicated in FIG. 2, a plurality of openings 3a are provided in a row in this cage 3, and rolling elements in the form of balls 4 are inserted through each of said openings 3a. These balls 4 roll over said track grooves 1a and 2a accompanying relative movement of bed 1 and table 2.

However, diameter $D_2$ of the edges of openings 3a, formed in cage 3 for insertion of balls 4, is formed slightly smaller than the diameter of balls 4. This arrangement is referred to as a rolling element holding system. As a result of being composed in this manner, cage 3 is positioned by each ball 4 and not allowed to move horizontally to the left and right. This prevents an increase in sliding resistance caused by full surface contact of said cage 3 with bed 1 and table 2. However, as indicated by the double dash broken line in FIG. 2, since cage 3 is able to rotate about the center of the axis that passes through each ball 4, there are cases wherein the corners of both its upper and lower edges make contact with bed 1 and table 2. However, since this contact is only in the form of linear contact, it does not become a major obstruction to obtaining a smooth sliding state.

However, since said cage 3 is formed into a thin plate, there is the problem of it being easy for balls 4 to come out of cage 3.

Therefore, a cage 3 was proposed as indicated in FIGS. 3 and 4. Furthermore, this cage 3 is also disclosed in Japanese Examined Utility Model Publication No. 64-6407.

As indicated in FIGS. 3 and 4, arc-shaped projections 3b are formed into a single structure in the state of protruding from the primary surfaces in this cage 3 so as to face openings 3a wherein balls 4 are inserted. These projections 3b serve to prevent balls 4 from coming out of openings 3a.

In the linear motion rolling guide unit of the prior art described above, cage 3, which is formed into a relatively thin plate, is easily subjected to warping. There are cases wherein the relative operating states of bed 1 and table 2 are obstructed by this warping. In addition, since projections 3b are formed over nearly the entire circumference of openings 3a, there is the additional disadvantage of increased slipping resistance with balls 4.

SUMMARY OF THE INVENTION

In consideration of the disadvantages of the prior art described above, the object of the present invention is to provide a cage that contributes to smooth operation of a rolling guide unit, as well as said rolling guide unit itself.

The present invention comprises a substantially plate-shaped cage having: a plurality of openings provided in a row, wherein each of a plurality of rolling elements are inserted; and, projections formed into a single structure so as to face said openings and in a state of protruding from the primary surfaces to prevent said rolling elements from coming out; wherein, said projections are formed continuously between adjacent openings.

In addition, the present invention comprises a rolling guide unit equipped with: first and second relative motion members able to move freely relative to each other, each having track grooves, and arranged so that said track grooves are opposing each other; a substantially plate-shaped cage, wherein a plurality of openings are formed in a row, and which is juxtaposed between said track grooves; and, a plurality of rolling elements inserted into each of said openings, and which roll over said track grooves; said cage having projections formed into a single structure so as to face said openings and in a state of protruding from the primary surfaces to prevent said rolling elements from coming out; wherein, said projections are formed continuously between adjacent openings.

DESCRIPTION OF THE PREFERRED EMBODIMENTS

The following provides an explanation of the linear motion rolling guide unit of the present invention with reference to the attached drawings.

Figure 1:
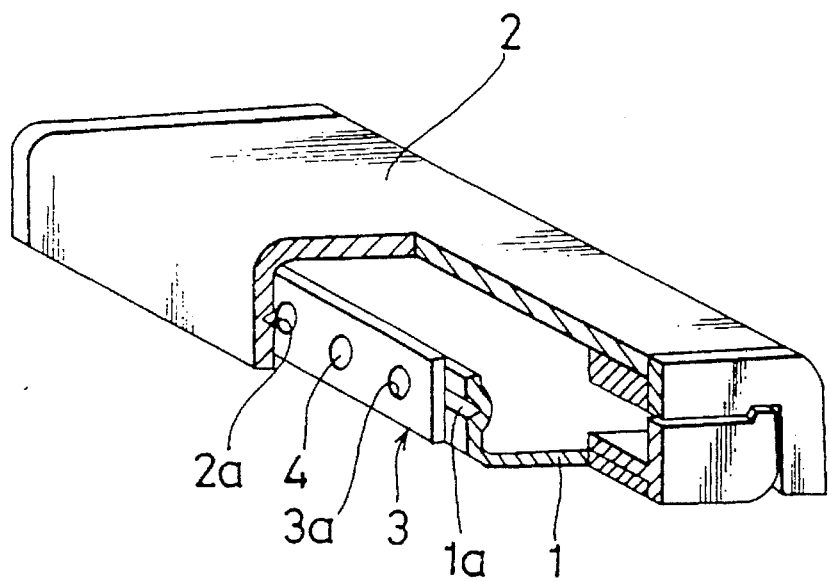
FIG. 1 is a perspective view, including a partial cross-section, of a rolling guide unit of the prior art.
Figure 2:
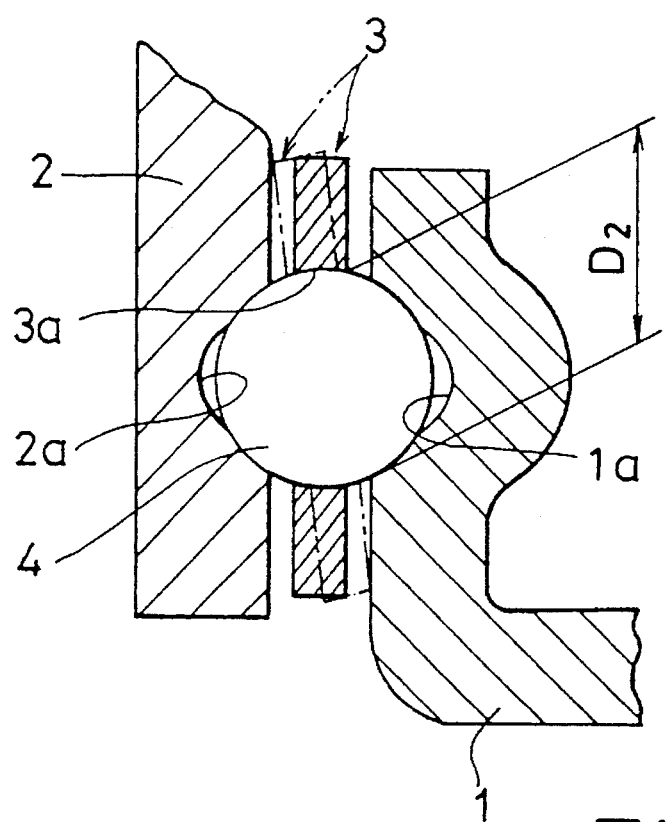
FIG. 2 is an enlarged view of the essential elements of the rolling guide unit indicated in FIG. 1.
Figure 3:
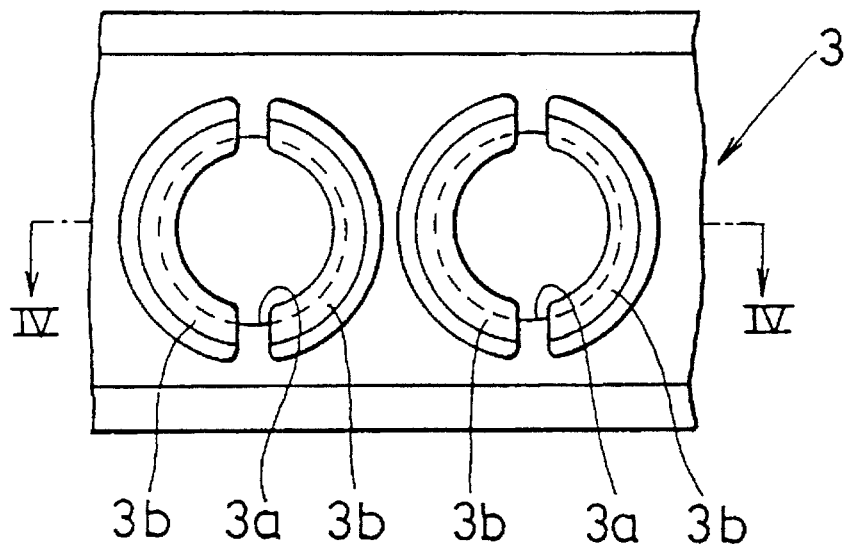
FIG. 3 is a front view of a portion of a cage equipped on the rolling guide unit indicated in FIGS. 1 and 2.
Figure 4:
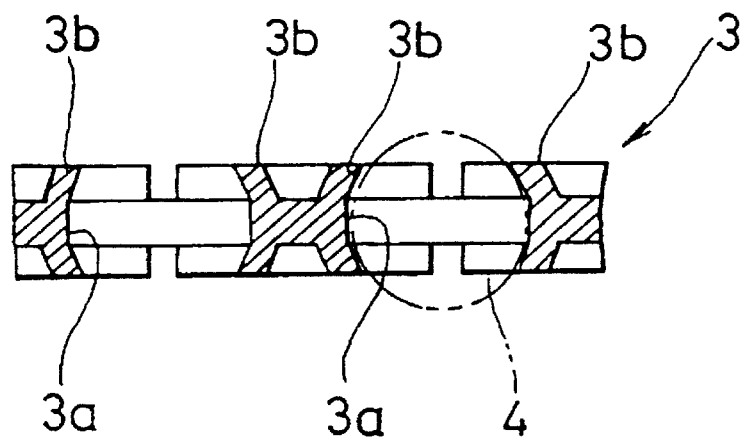
FIG. 4 is a cross-sectional view taken along lines IV—IV relating to FIG. 3.
Figure 5:
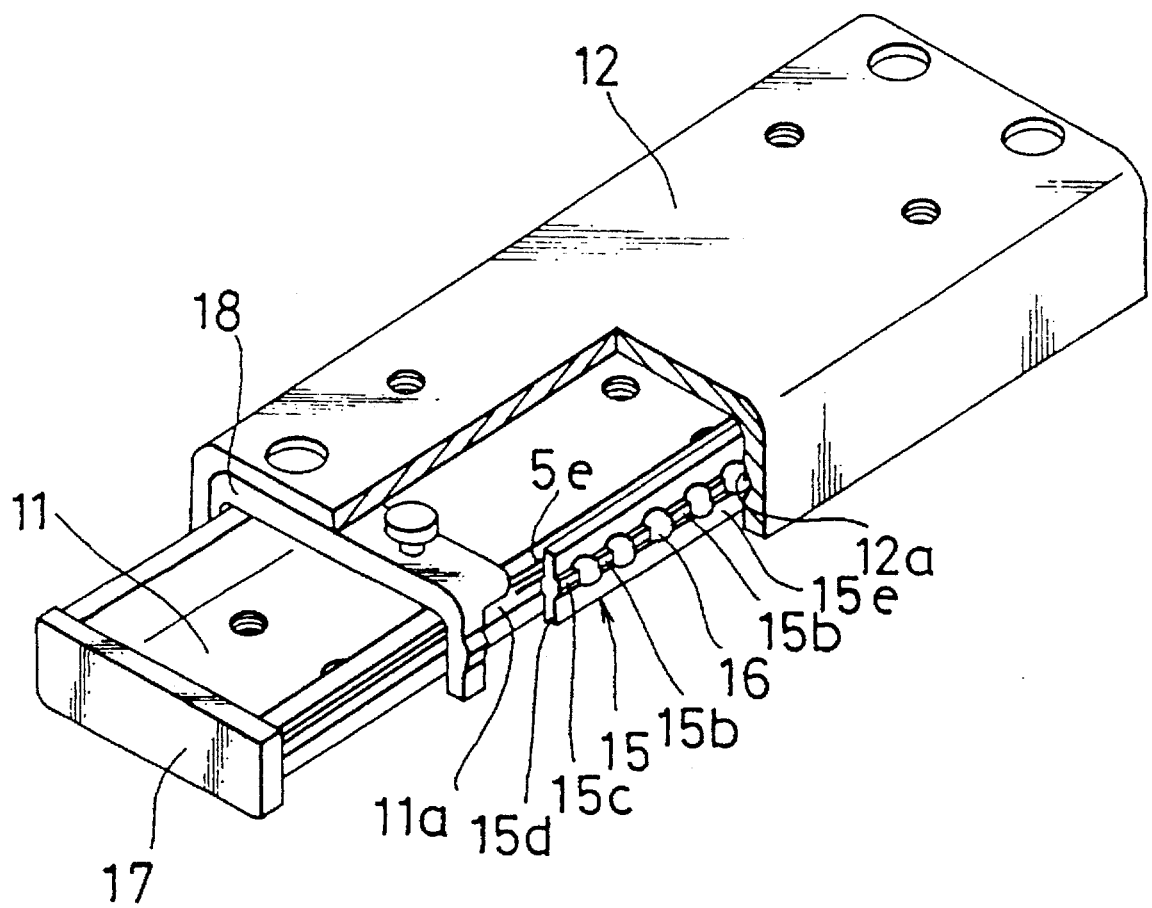
FIG. 5 is a perspective view, including a partial cross-section, of a rolling guide unit for linear motion claimed in the present invention.

As indicated in FIG. 5, the linear motion rolling guide unit claimed in the present invention has respective first and second relative motion members in the form of bed 11 and table 12. This bed 11 and table 12 are obtained by, for example, bending processing and punching processing and so on using sheet steel for the material. Said bed 11 and table 12 are formed so that the shape of their cross-sections, at a right angle with respect to their lengthwise shape direction, are substantially U-shaped. As is particularly clear from FIG. 6, track grooves 11a and 12a, having substantially V-shaped cross-sections, are formed in the outsides on the left and right sides of bed 11 and on the insides of both the left and right sides of table 12, respectively. Bed 11 and table 12 are arranged so that bed 11 is inside table 12 so that these track grooves 11a and 12a mutually oppose each other.

Cage 15, formed substantially into the shape of a rectangular plate and having a long shape, is juxtaposed between said track grooves 11a and 12a. FIGS. 7 through 12 indicate the details of this cage 15. Furthermore, cage 15 is comprised of an elastic substance such as synthetic resin or synthetic rubber and so forth.

As is indicated in FIG. 6 and FIGS. 8 through 12, a plurality of circular openings 15a are formed in a row in cage 15. Rolling elements in the form of balls 16 are inserted into each of said openings 15a. These balls 16 roll over said track grooves 11a and 12a accompanying linear movement of bed 11 and table 12. Furthermore, as indicated in FIG. 5, end caps 17 and 18 are provided on both the front and back ends of bed 11 and table 12 (only one end of bed 11 and table 12 is shown in the drawing) to prevent cage 15 and balls 16 from coming out.

As indicated in FIGS. 5 through 12, a plurality of projections 15b and 15c are formed into a single structure in both primary surfaces 15e of cage 15 so as to face said openings 15a and be in a state of protruding from said primary surfaces 15e. These projections are provided in the lengthwise direction of cage 15 to be arranged on a straight line from one end to the other end of said cage 15. Furthermore, those projections provided between mutually adjacent openings 15a are given the reference numeral 15b, while the two projections arranged on both ends of cage 15 are given the reference numeral 15c.

Each of said projections 15b and 15c perform the action of preventing balls 16, inserted into openings 15a, from coming out. Projections 15b are formed continuously between two openings 15a on both sides, while projections 15c are formed continuously from opening 15a, located in the vicinity of end surface 15d in the lengthwise direction of cage 15, to said end surface 15d. Thus, each of projections 15b and 15c are formed continuously between two mutually adjacent openings 15a and from openings 15a to end surface 15d of cage 15, respectively, thus making it difficult for cage 15 to become warped due to the resulting increased rigidity.

Figure 9:
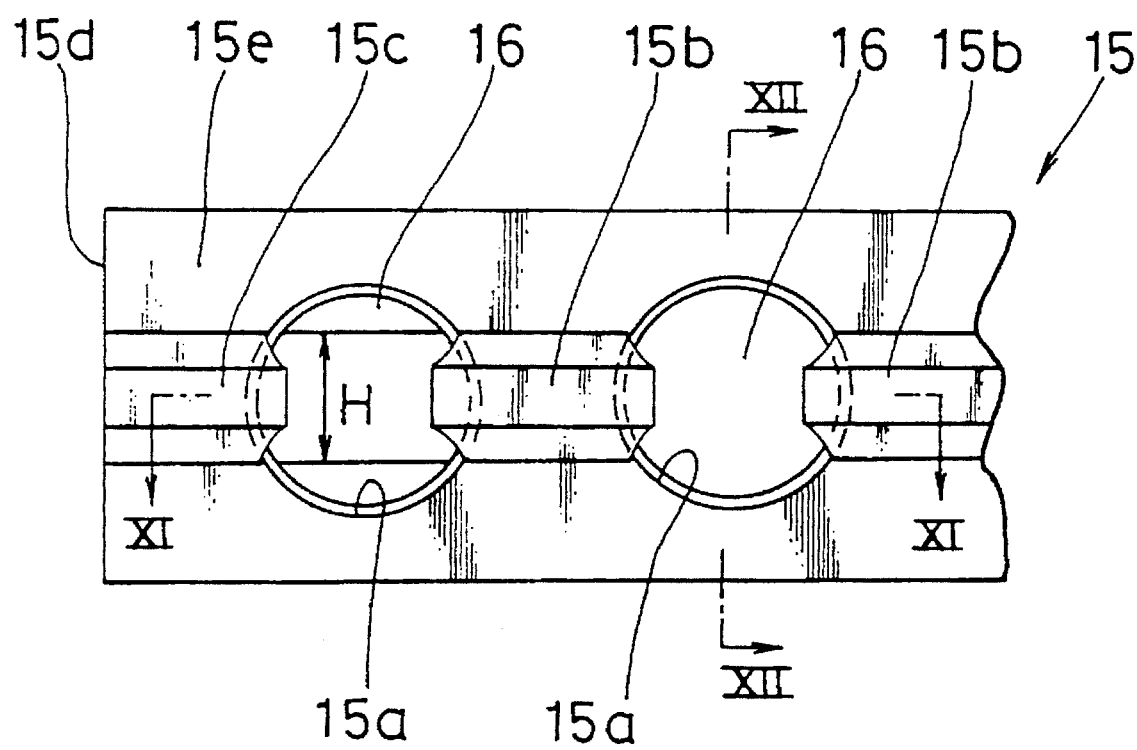
FIG. 9 is an enlarged view of section A in FIG. 8.
Figure 10:
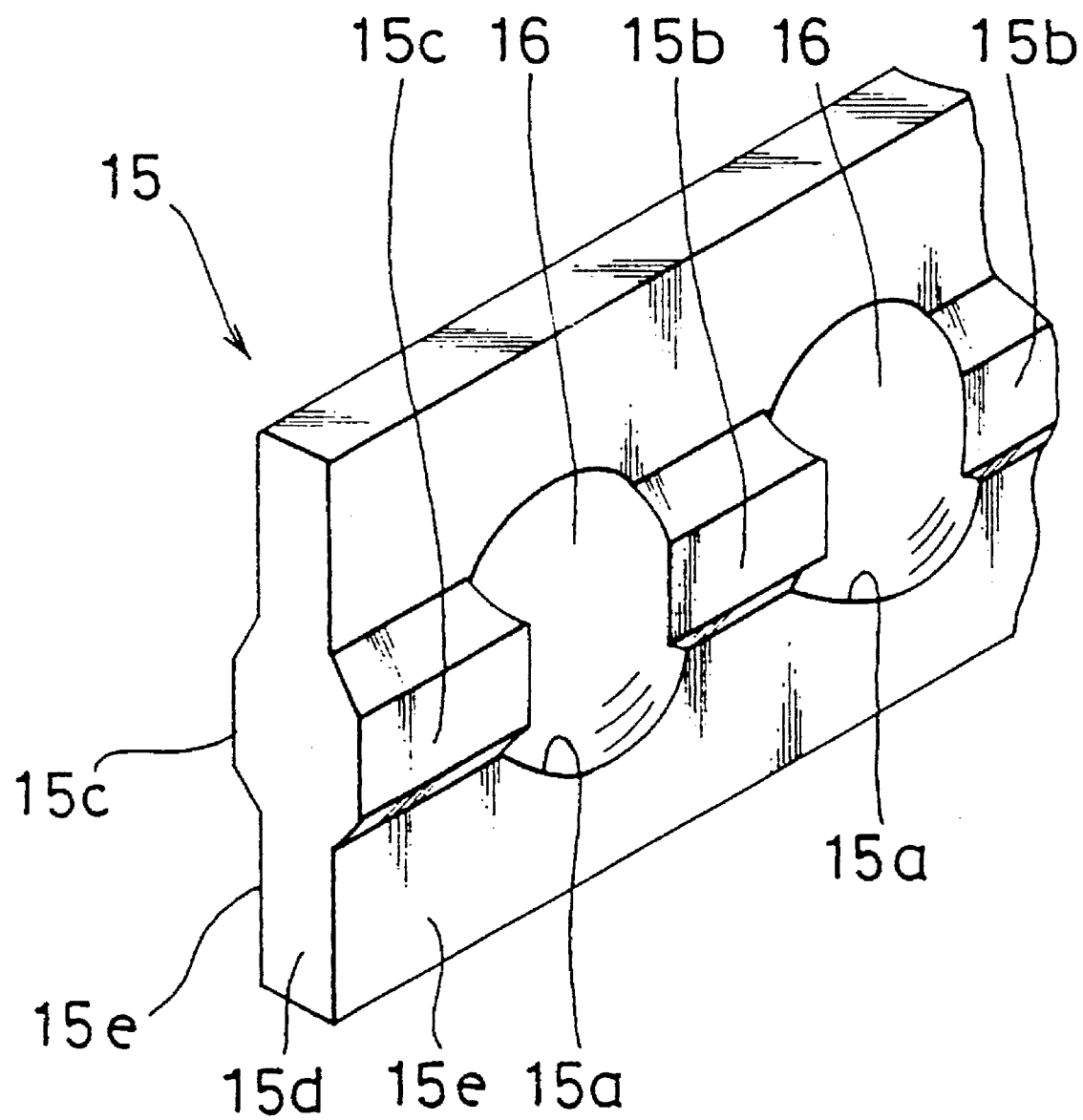
FIG. 10 is a perspective view of section A in FIG. 8.

However, as is particularly clear from FIGS. 9 and 10, each of said projections 15b and 15c are formed corresponding only to prescribed range H (indicated in FIG. 9), and not to the entire circumference of each opening 15a, in the direction at a right angle to the lengthwise direction of cage 15, or in other words, the direction of the width of cage 15. Thus, since the range formed by each projection 15b and 15c does not cover the entire circumference of openings 15a, but only a prescribed range, the surface area in mutual contact between each of said projections 15b and 15c and balls 16 is held to a low amount, thus reducing slipping resistance.

Figure 6:
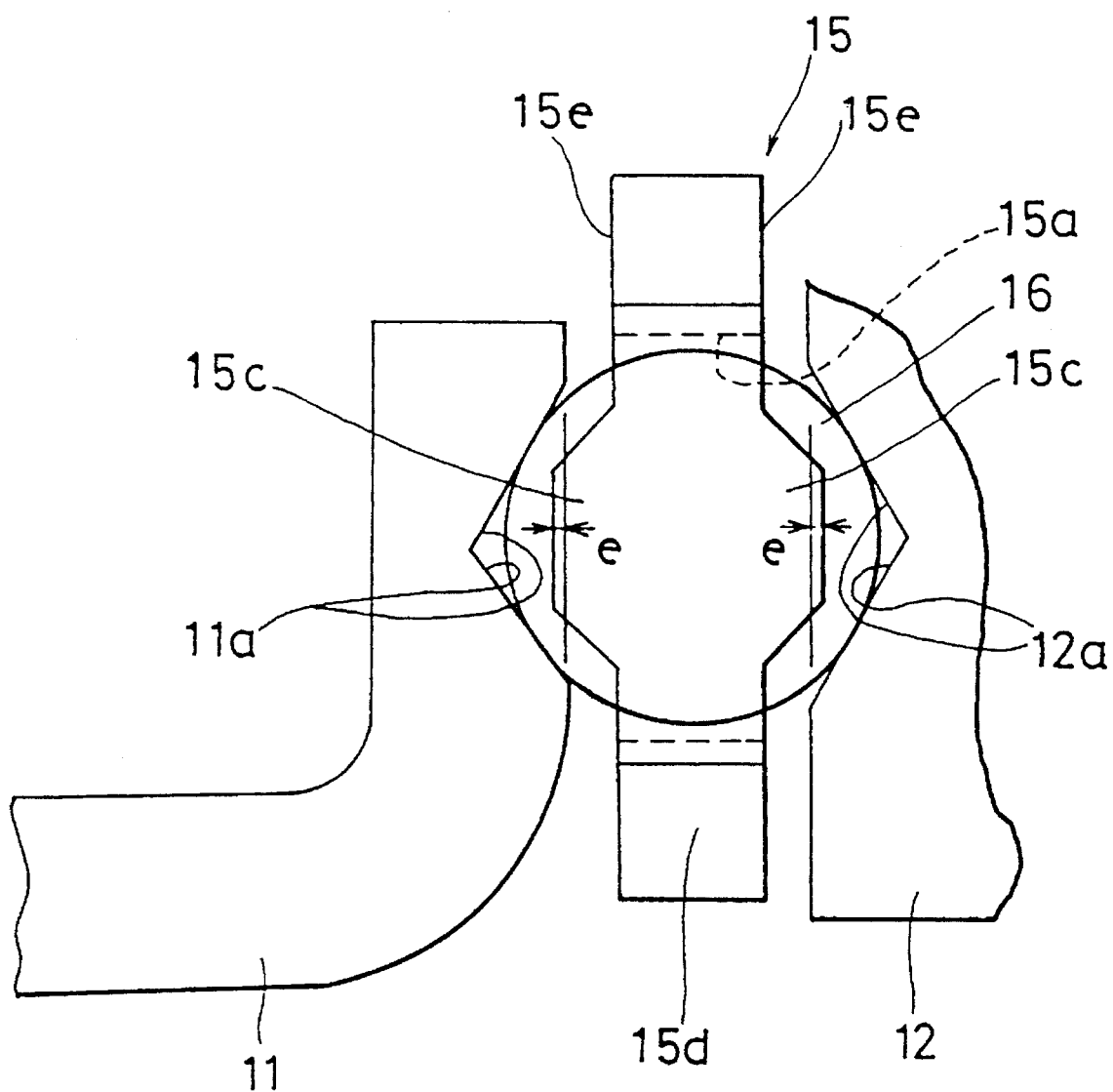
FIG. 6 is an enlarged view of the essential elements of the rolling guide unit indicated in FIG. 5.
Figure 7:
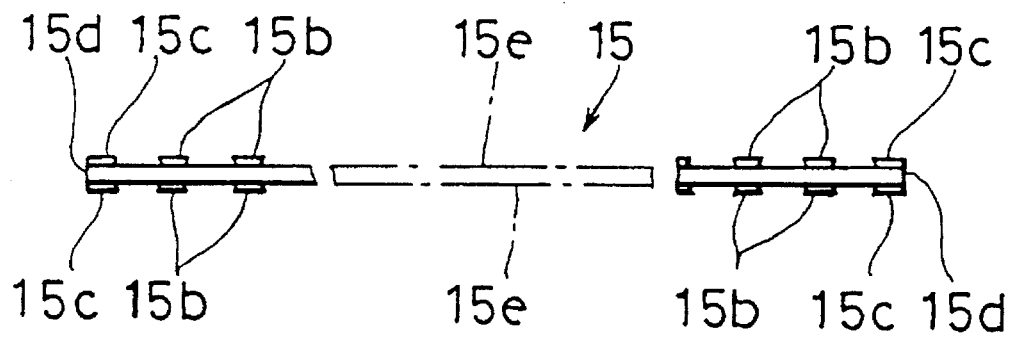
FIG. 7 is a top view of a cage equipped on the rolling guide unit indicated in FIG. 5.
Figure 8:
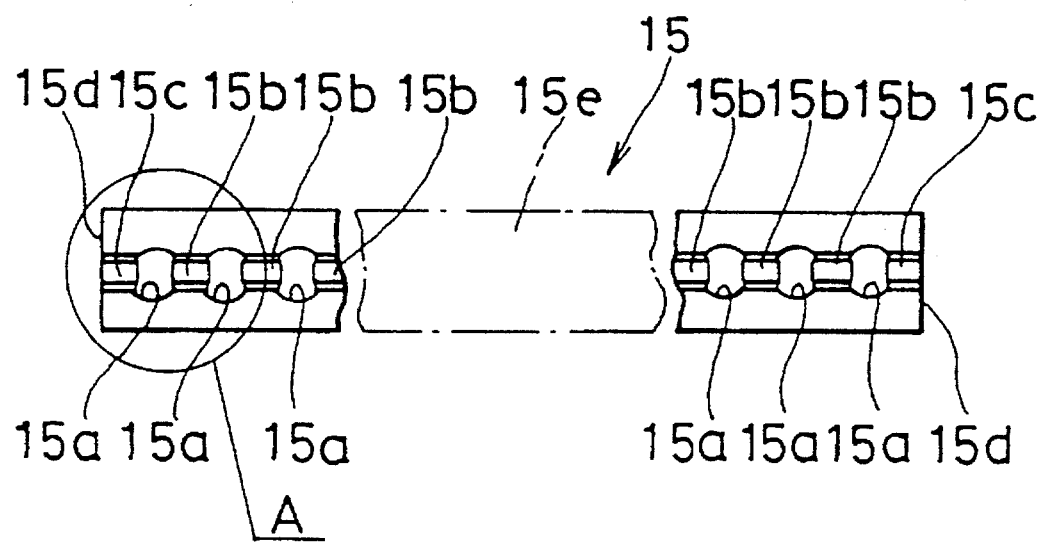
FIG. 8 is a front view of the cage indicated in FIG. 7.
Figure 12:
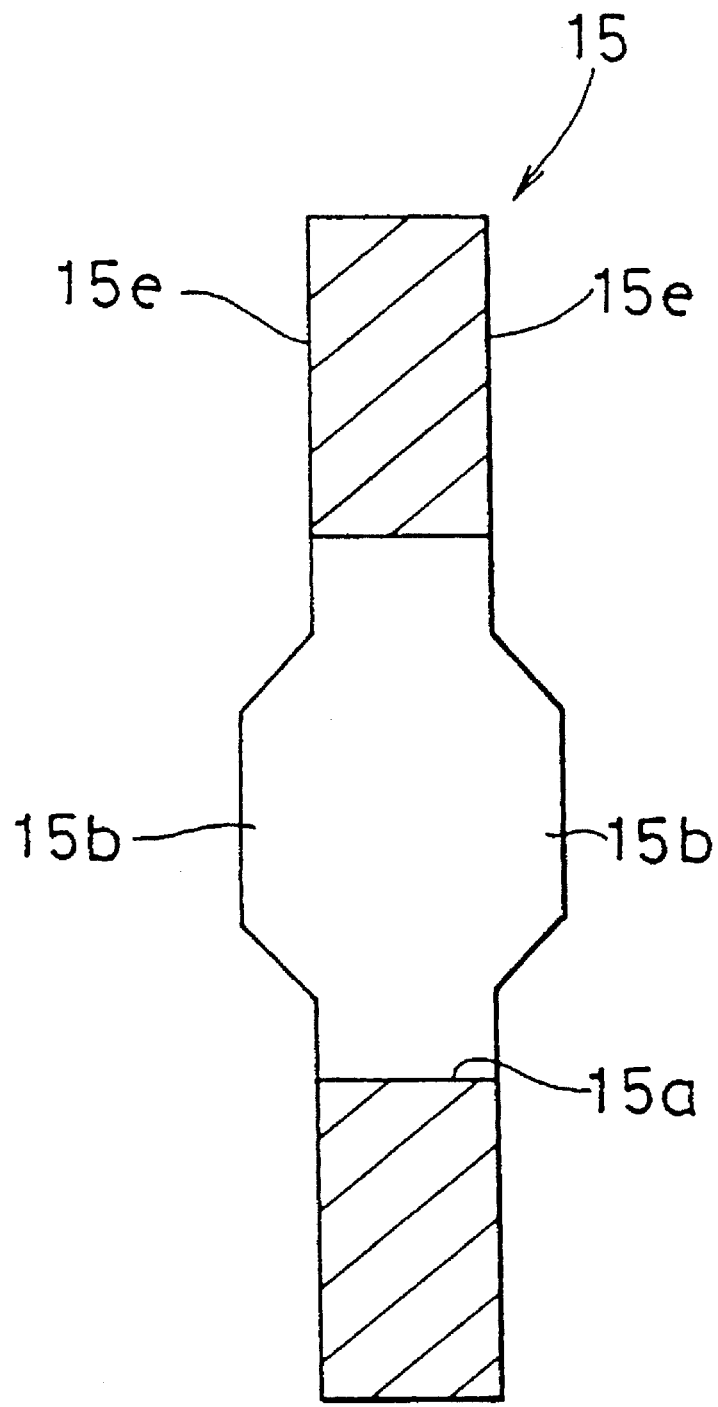
FIG. 12 is a cross-sectional view taken along lines XII—XII relating to FIG. 9.

In addition, as is clear from FIGS. 6, 10 and 12, the shapes of the cross-sections of each of projections 15b and 15c at a right angle to the lengthwise direction of cage 15 are trapezoidal. Due to said cross-sectional shape, it is difficult for these projections to interfere with each of the corresponding track grooves 11a and 12a of bed 11 and table 12 as indicated in FIG. 6. In addition, rigidity is increased making each of said projections 15b and 15c durable. Furthermore, as indicated in FIG. 6, each of projections 15c (15b) are formed to a height at which their ends enter the insides of each of track grooves 11a and 12a of bed 11 and table 12 by only the amount of dimension e. As a result of having this structure, said projections 15b and 15c are easily able to prevent balls 16 from falling out of cage 15, and balls 16 and cage 15 can be prepared prior to assembly of said linear motion rolling guide unit in the form of a ball and cage assembly by incorporating said balls 16 in said cage 15.

The following provides a detailed description of the form of each of the openings 15a as well as projections 15b and 15c formed in cage 15.

Figure 11:
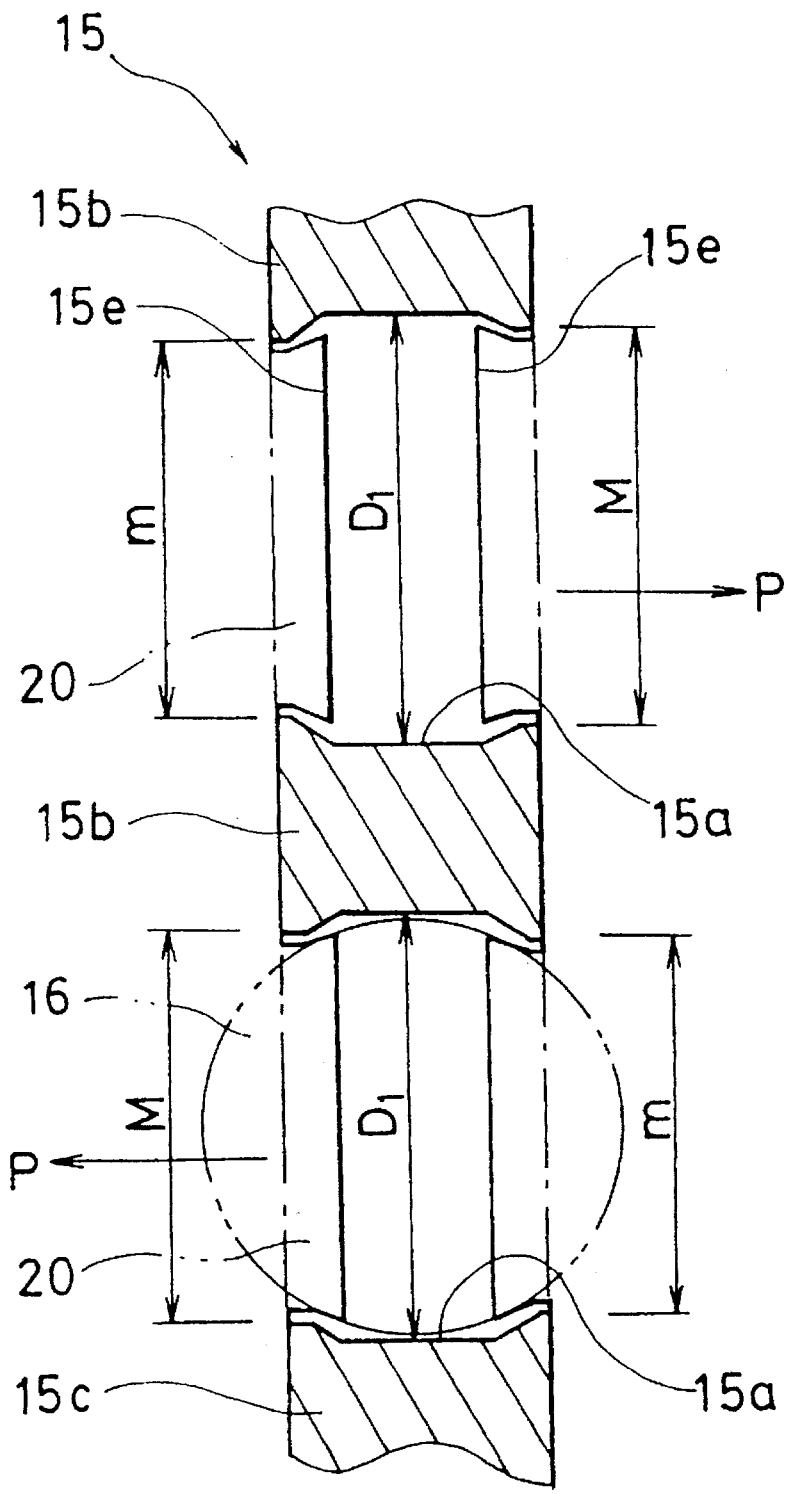
FIG. 11 indicates the process for manufacturing a cage in the form of a cross-sectional view taken along lines XI—XI relating to FIG. 9.

As is clear from FIG. 11, each of openings 15a is formed so that its diameter $D_1$ is slightly larger than the diameter of balls 16 that are inserted therein. With respect to each of projections 15b and 15c provided so as to face each of said openings 15a, the intervals between adjacent projections 15b or the intervals between projection 15b and projection 15c are smaller than the diameter of balls 16, and are equal to dimensions M and m so as to differ on both sides of openings 15a. Moreover, these intervals differ in alternating fashion in the lengthwise direction of cage 15. Furthermore, the relationship between each of these dimensions is as follows: D>M>m.

The dimensional relationship described above is the result of injection molding of said cage 15. The following provides an explanation of the method for manufacturing cage 15.

Firstly, pins 20, of a shape of a barrel in which both ends are chamfered as indicated in FIG. 11, are arranged at a constant pitch inside a metal mold (not shown) for manufacturing of the cage. Molten synthetic resin and so on is then injected into said metal mold followed by cooling and solidification. The mold is then separated and the resulting molded article is removed. Pins 20 are removed in the opposite direction in alternating fashion as indicated by arrow P, thus resulting in cage 15.

When pins 20 are being removed as described above, the portion on the side of the direction in which they are removed is spread apart. This results in the larger interval M described above.

As described above, by pulling out pins 20 in the opposite direction in alternating fashion, different intervals M and m are arranged in a row in alternating fashion in the lengthwise direction of cage 15. Thus, although cage 15 is able to rotate about the center of the axis that passes through each of balls 16, it does not move in the horizontal direction, and an increase in sliding resistance, caused by full-surface contact by said cage 15 with the outside surface of bed 1 and the inside surface of table 12, is prevented.

Furthermore, although a rolling guide unit for linear motion is indicated in the embodiment described above, the present invention can also be applied to, for example, an arc-shaped rolling guide unit that follows a curved path.

In addition, although rolling elements in the form of balls 16 are indicated in the embodiment described above, the present invention is not limited to such, but rather may also be of a constitution wherein rollers and so forth are used.

According to the present invention as explained above, since projections, that prevent rolling elements from coming out of a plurality of openings formed in a row for insertion of rolling elements, are formed continuously between each opening, the cage is less susceptible to warping due to its increased rigidity, thus offering a first advantage of achieving a smooth operating state of the rolling guide unit.

In addition, since the range over which said projections are formed is not over the entire circumference of said openings, but rather only over a prescribed range, the surface area at which there is mutual contact between said projections and the rolling elements is held to a small amount and reduces the amount of slipping resistance, thus offering a second advantage of even smoother sliding.

What is claimed is:

1. A rolling guide unit for finite linear motion, said rolling guide unit comprising:

a bed having a first track groove extending in the lengthwise direction of its side surface;

a table having an inverted U-shaped cross-section, said table being positioned on said bed and performing finite linear motion with respect to said bed, said table having a second track groove formed therein at a location in opposition to said first track groove;

a substantially plate-shaped cage in which a plurality of openings are arranged in a row, said cage having a linear shape and being positioned between said first and second track grooves;

rolling elements inserted into each of said openings that roll over said first and second track grooves;

wherein said cage is formed from plastic into a single structure and has projections facing said openings and located between first and second track grooves, said projections protruding from the primary surface of said cage continuously between adjacent openings and extending in the lengthwise direction, said projections being formed on said primary surface on the front and back of said cage;

wherein the width between adjacent ones of said projections facing said openings is smaller than the diameter of said rolling elements to prevent said rolling elements from falling out of said openings, and the width between said adjacent ones of said projections alternates between large and small widths; and, wherein said primary surface is positioned to not make contact with said bed and said table over the entire surface thereof.

2. The cage of claim 1 wherein said projections are formed continuously from said opening located in the vicinity of an end surface in the lengthwise direction of said cage to said end surface.

3. The cage of claim 1 wherein said projections are formed corresponding to a prescribed range, and not over the entire circumference of said openings, in the direction of the width of said cage substantially at a right angle to the lengthwise direction of said cage.

4. The cage of claim 1 wherein said projections the shape of their cross-section substantially at a right angle to the lengthwise direction of said cage is substantially trapezoidal.

5. The cage of claim 1 wherein said cage is formed in a linear shape.

* * * * *